Jan. 12, 1965  J. N. MULLINS, JR  3,164,968
METHOD AND APPARATUS FOR REMOVING ICE FROM
AN ICE MAKING MACHINE
Filed Aug. 17, 1962  2 Sheets-Sheet 1

James N. Mullins JR.
INVENTOR.

BY Browning, Simms, Dyer
& Eickenroht

ATTORNEYS

Jan. 12, 1965 J. N. MULLINS, JR 3,164,968
METHOD AND APPARATUS FOR REMOVING ICE FROM
AN ICE MAKING MACHINE
Filed Aug. 17, 1962 2 Sheets-Sheet 2
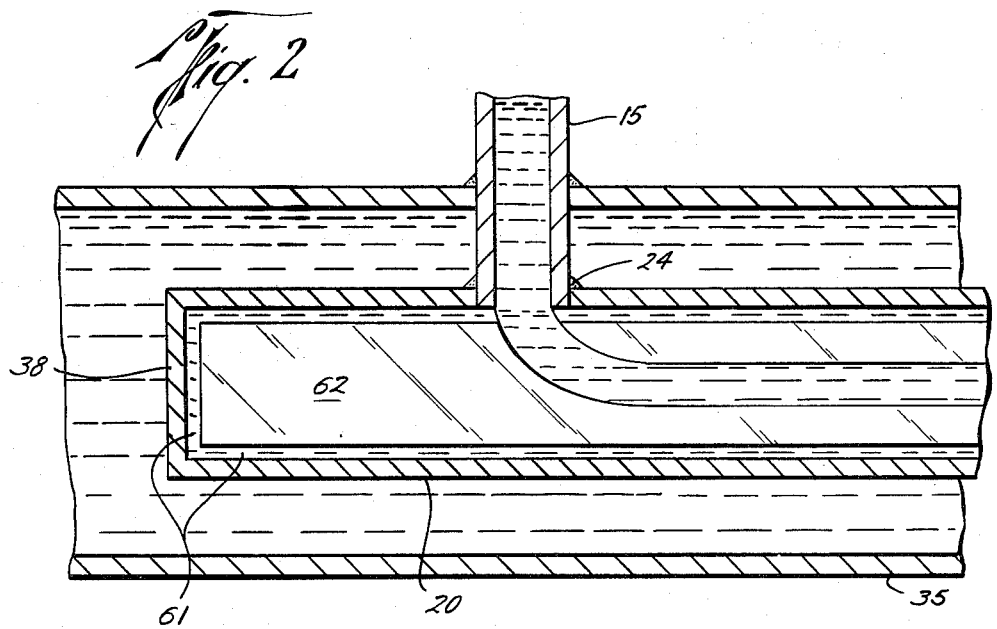
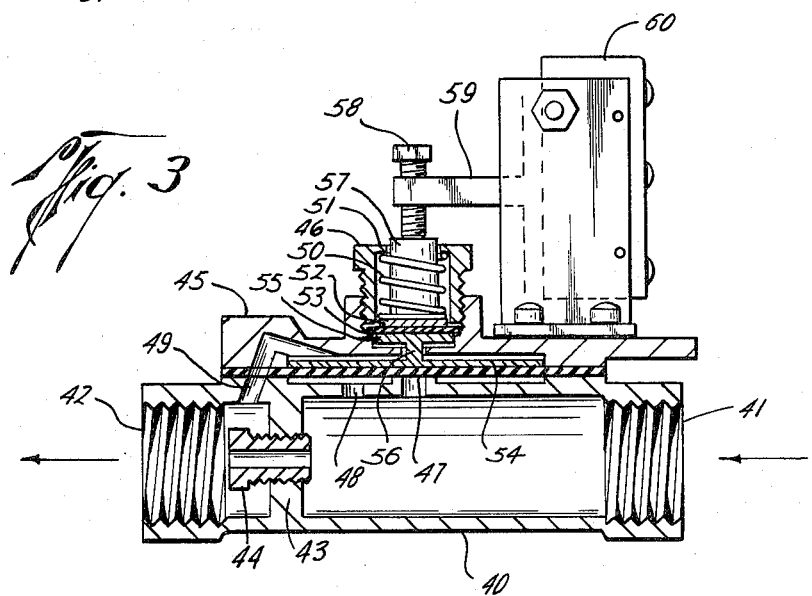
James N. Mullins Jr.
INVENTOR.
BY Browning, Simms, Hyer
& Eickenroht
ATTORNEYS

United States Patent Office 3,164,968
Patented Jan. 12, 1965

3,164,968
METHOD AND APPARATUS FOR REMOVING ICE FROM AN ICE MAKING MACHINE
James N. Mullins, Jr., P.O. Box 4398, Fort Worth, Tex.
Filed Aug. 17, 1962, Ser. No. 217,610
12 Claims. (Cl. 62—73)

This invention relates to liquid-freezing machines generally and, in particular, to liquid-freezing machines which employ elongated freezing tubes within which the liquid is frozen. Specifically, this invention is directed toward simplifying the step of removing the frozen liquid from the elongated freezing tubes.

Liquid-freezing machines of the type with which this invention is concerned are most commonly used to produce ice in small pieces for use in bars, restaurants, etc.

These machines can be used to freeze liquids other than water, of course, but since producing ice is their most common function, the invention will be described in that connection.

Structurally, these machines comprise one or more elongated tubes in which the water is frozen. To conserve space, these tubes can be formed as a helix. A refrigeration system is arranged to alternately cool and heat the tubes and a water circulation system is provided to supply the water to be frozen and to force the ice out of the tube when a sufficient amount has formed. For a complete description of a liquid-freezing machine of this type, see Patent No. 2,821,070 issued January 28, 1958, to J. R. Watt et al., entitled "Ice Making Machine and Storing Apparatus."

In operation, the water circulating system fills the elongated freezing tube and slowly circulates the water during the freezing cycle. The water is introduced into the tube at a point spaced a short distance from one end of the tube so that the water below this point will not be circulated. Not being circulated, this water freezes faster than the circulated water and forms a solid plug of ice before sufficient ice has formed in the rest of the tube to be removed. Except for this short section, the ice rod is not allowed to freeze solid but is removed from the tube when it still has a central unfrozen section or core. This is done to avoid subjecting the freezing tube to the strain which would result should the ice rod freeze solid and to avoid trapping the minerals precipitated out of the water by the freezing process and which can be removed by the circulating water if the tube does not freeze completely.

When sufficient ice has formed in the tube, it is removed by reversing the refrigerating cycle so that the tube is heated rather than cooled. This defrosts the tube, freeing the ice for easy removal. To remove the ice, an ejecting fluid, which is usually water but which can be air, is forced into the lower end of the tube below the solid plug. This ejecting fluid acts on the plug or piston of ice, forcing it and the core of ice above it out of the tube to be broken up into "chips" or "cubes." By forming the short section of solid ice at the lower end of the tube, the amount of ejecting fluid required is greatly reduced since it closes the central opening which would otherwise extend through the ice and allow a large quantity of the ejecting fluid to escape.

Heretofore, it was considered necessary to inject the ejecting fluid into the lowermost point of the freezing tube below this solid plug of ice to obtain the full benefit of the plug. Thus, two separate water pressure systems were required, one for circulating the water during the freezing cycle and one for ejecting the ice during the so-called "harvest" cycle. Having two separate water pressure systems, each of which required controls, greatly complicated these ice making machines.

Therefore, it is the principal object of this invention to provide an ice making machine which employs the same water pressure system to both circulate the water during the freezing operation and to harvest the ice formed thereby. It is an additional object of this invention to provide a method of harvesting the rod of ice formed in an elongated freezing tube which uses the same circulating system as is used to circulate the water during the freezing operation.

It is a further object of this invention to provide apparatus which will automatically control the quantity and pressure of the water delivered to the tube so that both the circulating function and the harvesting function can be accomplished without requiring a change in the pressure of the water supplied to the apparatus.

It is also an object of this invention to provide apparatus which can receive water at a constant pressure and automatically reduce the pressure so that the proper amount of water will be circulated during the freezing cycle and which will automatically supply high pressure water during the harvesting operation.

Briefly, the invention can be described as follows: The water is introduced into the freezing tube at a point above the lower end of the tube in the conventional manner. However, instead of directing the ejecting fluid into the tube below the plug, the ejecting pressure is injected into the tube at the same point as the circulating water. The defrosting cycle then melts the ice adjacent the walls of the tube and adjacent the end of the tube so that the pressure of the ejecting fluid is transmitted through the layer of water along the walls of the tube to the water below the plug of ice in the end of the tube. This pressure moves the plug forward until it passes the point of entrance of the ejection fluid and the ice is then forced out of the tube in the conventional manner.

By using the method of harvesting described above, the number of connections to the freezing tube is reduced, which is advantageous. However, it is an additional important feature of this invention and one of its principal objects to provide a simple control device which automatically controls the pressure and volume of the water entering the freezing tube in response to the conditions in the tube. This is accomplished by placing a restriction, such as an orifice, in the line supplying the water to the freezing tube. This produces a pressure drop in the line which is directly proportional to the rate of flow of the water into the tube. This reduces the controls necessary to operate the machine to a simple pressure-measuring device to control the cooling and heating of the freezing tube. No other controls are needed since by simply supplying the flow restricting device with water at a constant pressure, the circulating and harvesting operations will occur automatically. The orifice is designed to allow the amount of water to pass which is necessary for circulating purposes. At this rate of flow, there is a large pressure drop across the orifice. As the ice rod builds up, the rate of flow decreases and the pressure drop across the orifice decreases. When sufficient ice has formed to restrict the rate of flow to a predetermined amount, as measured either by the pressure drop across the orifice or the downstream pressure, the cooling cycle is stopped and the heating cycle begun. At this time, the pressure downstream of the orifice is sufficient to push the ice out of the tube so that as soon as the ice has been melted adjacent the walls and the end of the tube, the harvesting cycle will begin automatically. As the ice moves out of the tube, the rate of flow of the water into the tube will increase and its pressure will decrease due to the orifice. However, the pressure required to lift the ice will be decreasing also, so there will always be adequate pressure available to move the ice out of the tube.

The invention will now be described in detail in connection with the attached drawings in which:

FIG. 2 is a cross-sectional view through the lower end of the freezing tube showing the conditions therein just before the ice is forced from the tube; and FIG. 3 is a vertical cross-section of the device which controls the operation of the machine.

Figure 1:
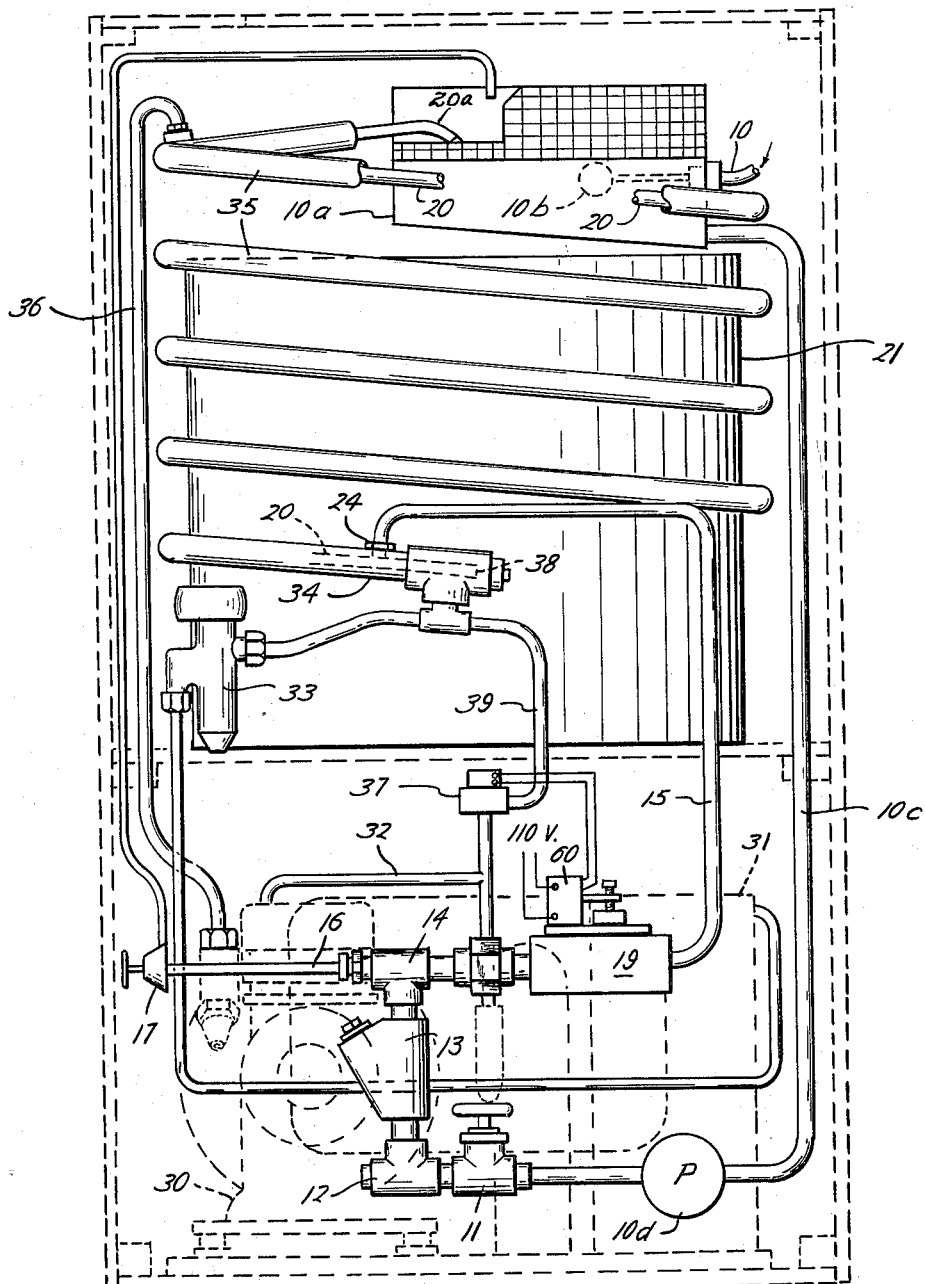
FIG. 1 is a front view of an ice-making machine embodying the invention illustrating the arrangement of the various components.

The freezing machine consists of two flow systems: the refrigerating system and the water system. Both of the systems are illustrated in the drawings in a simple form, it being understood that many efficiency improving devices, such as heat exchangers, can be employed in a commercial embodiment of the machine but which are left out of the drawings and the description for the sake of clarity.

The water system begins with line 10 which is connected to a source of water and empties into a sump 10a through a suitable liquid level control such as float valve 10b. The water then flows through suction line 10c to pump 10d which not only fills the freezing tube at the end of the harvest cycle, but also circulates water during the freezing cycle.

Downstream from the pump 10d is the manual shut-off valve 11, the T 12, the strainer 13 and the T 14 which has the lines 15 and 16 leading therefrom. In line 16 is the pressure relief valve 17 which serves to maintain a constant pressure on the discharge side of the pump. The relief valve discharges water into sump 10a, which water is recirculated. Line 15 is connected to freezing tube 20 at a point 24 spaced a short distance above its lower end 38. Located in line 15 is control 19, which will be described in detail below. The freezing tube spirals upward around the storage tank 21 and discharges onto a screen over sump 10a which separates the water from the ice. The water is collected in the sump and returned to the pump for recirculation through suction line 10c while the ice pieces fall into bin 21.

Also located adjacent the upper end of the tube 20 is an ice breaker 20a, shown here as being simply a change in curvature of the end of the tube. It is the function of this breaker to deflect the ice rod as it leaves the tube and thus break the rod into conveniently sized pieces of ice.

The refrigerating system is conventional and includes a condenser, an evaporator, and an expansion valve through which a refrigerant is circulated by the compressor 30. The condenser 31 is located adjacent the compressor and receives the refrigerant (through the line 32) after it has been compressed by the compressor. The refrigerant, after compression, contains a substantial amount of heat which is used to defrost the freezing tube during the defrost stage of the process in the manner described below.

The expansion valve 33 is located downstream from the condenser and serves to produce a large pressure drop between the condenser and the evaporator 34.

The freezing tube 20 is surrounded throughout most of its length by a larger tube 35. The annular space between these tubes serves as the evaporator 34 of the refrigeration system and allows the refrigerant to cool the entire length of freezing tube. To increase the efficiency of the evaporator and insure a more uniform build-up of ice in the tube, the refrigerant can be introduced at more than one point along the tube. The refrigerant leaves the evaporator and re-enters the compressor 30 through the line 36.

Many types of controls are available to control the over-all operation of the machine, i.e., start the machine when ice is desired and stop it when the storage tank is full. For example, a temperature sensitive control can be located in the storage bin which will stop the machine when the ice reaches a certain level. These controls would simply start and stop the compressor and the water pump. When the machine is operating, however, it is control 19 which controls both the water system and the refrigerating system, causing them to continuously produce ice.

The construction of the control 19 is illustrated in FIG. 3. It consists of a tubular housing 40 which is installed in the water line 16 so that the water flows into the housing through opening 41 and out through opening 42. Partition 43 is provided to support the choke or orifice 44.

Connected to the control housing is the diaphragm housing 45 which in turn supports the spring housing 46. Diaphragm 47 is arranged so that the water pressure upstream of the orifice 44 is exerted against the bottom of the diaphragm through opening 48 and the downstream water pressure is exerted against the top side of the diaphragm through the opening 49. Spring 50 also exerts a downward force on the diaphragm. It is compressed between the shoulder 51 of the spring housing and the plate 52 which in turn exerts a downward force on the spring diaphragm 53. This force is then transmitted to the diaphragm 47 by means of the plate 55 located below the spring diaphragm, the rod 56 and the diaphragm plate 47.

Extending through the spring 50 is the switch actuator 57. It engages the plate 52 and the set screw 58 so that any motion of the plate 52 will be transmitted to the set screw. Movement of the set screw operates the switch arm 59 which opens and closes the electric switch 60. This swtich controls the hot gas solenoid valve 37 located in line 39 leading from the compressor to the evaporator 34.

*Operation*

At the beginning of an ice making cycle, water enters the machine through the line 10 and is pumped through the control 19, the freezing tube 20 and into the pump sump 10a to be recirculated. All of the water in the freezing tube is not circulated, of course, since the water enters at the point 24 located a short distance above the lower end 38 of the tube. Relief valve 17 is set to maintain a constant water pressure upstream of the control 19.

At this point in the operating cycle, the pressure drop across the orifice 44 is at a maximum, as is the volume of water passing through the orifice. This differential in pressure acts against the diaphragm 47, forcing the diaphragm plate 54 and the plate 55 upward. This in turn forces the spring diaphragm and the switch actuator upward, which holds the switch 60 in the off position.

As the water is circulated, the refrigeration system is constantly removing heat from the water through the walls of the freezing tube by the evaporation of the refrigerant in the evaporator 34. The water in the lower end of the tube freezes rapidly since it is not being circulated and forms a solid plug of ice. As the cooling continues, the water being circulated begins to freeze along the inside wall of the freezing tube. As the ice builds up, the rate of flow of water through the tube decreases, which produces a corresponding decrease in the pressure drop across the orifice 44 in the control 19.

When this pressure drop reaches a predetermined minimum amount, which indicates that the opening through the ice rod has reached a certain size, the downward force exerted by the spring 50 plus the downstream pressure is sufficient to overcome force exerted by the upstream pressure and the diaphragm 47 moves downward. This causes the switch actuator 57 to move downward closing the switch 60 which opens the hot gas solenoid valve 37. At this point, the defrosting cycle begins.

By opening the hot gas solenoid valve 37, the hot, gaseous refrigerant on the discharge side of the compressor is diverted from the condenser to the evaporator through the line 39.

As the heating of the freezing tube takes place, the water system continues to circulate water into the freezing tube at the point 24. The pressure of the water at this point is now at its highest, approaching the pressure upstream from the orifice, and it, therefore, has ample pressure to force the ice out of the freezing tube. Under these conditions, the ice will begin to move immediately when a sufficient amount has been melted adjacent the walls of the tube and across its end to transmit the pressure.

The condition just prior to the removal of the ice is illustrated in FIG. 2. The ice 62 has been melted adjacent the walls of the tube 20 and its lower end 38 so that the pressure of the water as it enters the tube is transmitted through these water films 61 to the end of the solid plug of ice 62. The water pressure then acts against the solid end of the ice rod to force the ice rod out of the tube.

At this point, it should be noted that since the distance between point 24 and the lower end 38 of the freezing tube is relatively small compared to the over-all length of the tube, the resistance to flow of water (along the space between the ice rod and tube) between point 24 and the upper end of the tube is much greater than that between point 24 and end 38. Therefore, essentially full circulating water pressure will be applied to the lower end of the ice rod.

As the ice rod moves out of the tube and is broken up into small pieces by the breaker, the force necessary to move it decreases. This decrease in pressure allows the rate of flow of water into the tube to increase with a corresponding increase in the pressure drop across the orifice 44. When this pressure differential reaches a predetermined amount, the upstream pressure in the control 19 can again overcome the combined pressure exerted by the downstream pressure and the spring and open the switch 60 to close the hot gas solenoid valve 37. This returns the refrigerating system to its freezing cycle and it again begins to cool the walls of the freezing tube 20. This usually occurs before the ice rod has been completely ejected from the tube but since there will be a slight delay before cooling can begin and since the walls of the tube have just been heated by the defrosting cycle, there is ample time for the ice to be completely removed before ice begins to form in the tube again.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A liquid freezing machine comprising, in combination, a freezing tube having an outlet at one end and an inlet adjacent to but spaced from the other end; means for supplying the tube with liquid to be frozen to fill the portion of the tube between the inlet and the end adjacent thereto with the liquid and to circulate the liquid to be frozen through the portion of the freezing tube between the inlet and the outlet;

refrigerating means associated with the freezing tube and arranged to freeze the liquid in the portion of the tube between the inlet and the adjacent end of the tube into a solid plug and the liquid being circulated between the inlet and the outlet into a core having an opening sufficiently small to reduce the amount of liquid being circulated to a predetermined amount;

heating means associated with the freezing tube arranged to melt the frozen liquid adjacent the inside of the tube so that the pressure of the circulating liquid will be exerted along the inside of the tube and between the end of the solid plug of frozen liquid and the end of the freezing tube to force all the frozen liquid out of the freezing tube; and control means arranged to actuate the heating means when the amount of liquid being circulated through the freezing tube reaches a predetermined amount.

2. The combination of claim 1 in which the control means comprises a flow restricting device arranged to produce a pressure drop which decreases as the quantity of liquid flowing through the control means decreases.

3. The combination of claim 2 further provided with means for supplying liquid to the control means at a constant pressure.

4. The combination of claim 3 in which the flow restricting device comprises a member having an opening therein through which the liquid flows, said opening being arranged to maintain turbulent free flow of the liquid through the tube between the inlet and the outlet when the rate of flow of the liquid is a maximum.

5. The combination according to claim 1 further provided with means for increasing the amount of liquid delivered to the inlet of the tube during the period that the heating means are actuated.

6. A liquid freezing machine comprising, in combination, a freezing tube having an inlet thereto located adjacent to but spaced from one end of the tube and an outlet therefrom; means for refrigerating the freezing tube to freeze the liquid therein, and means for heating the freezing tube;

means for supplying the freezing tube through the inlet with a liquid to be frozen at a pressure sufficient to force the frozen liquid out of the freezing tube, to fill the portion of the tube from the inlet to the end adjacent thereto with uncirculated liquid and to circulate liquid through the tube between its inlet and its outlet to allow the uncirculated liquid to freeze into a solid plug and the circulated liquid to freeze into a core having an opening therein; and control means to restrict the flow of liquid into the freezing tube so that the pressure of the liquid entering the freezing tube will be less than the pressure of the supply liquid, and pressure sensitive means associated with the control means arranged to energize the heating means when the pressure drop across the control means decreases to a predetermined amount so that the frozen liquid will be released from the tube and forced out of the tube by the continuously circulating liquid.

7. In a liquid freezing machine comprising an elongated, inclined freezing tube, means for supplying a liquid under pressure, a line connecting the freezing tube, at an inlet point located a relatively short distance above the lower end of the tube, to the liquid supply means, an outlet opening in the upper end of the tube for discharging the liquid so that the liquid is continuously circulated through the tube between the inlet point adjacent the lower end and the outlet opening, means for alternately refrigerating and heating the freezing tube; and flow restricting means in the line connecting the liquid supply means and the freezing tube to restrict the rate of flow of liquid into the tube so that the liquid can be circulated through the tube without turbulence as the liquid is being frozen and to provide sufficient pressure at the inlet to the tube to force the frozen liquid out of the tube when the tube is being heated.

8. The combination of claim 7 further provided with means for supplying the liquid to the flow restricting means at a constant pressure.

9. The combination of claim 8 in which the flow restricting means comprises a member having a flow restricting opening therein.

10. The method of producing frozen liquid, comprising continuously injecting the liquid to be frozen into an inclined, elongated tube at a point adjacent to but spaced above the lower end of the tube;

cooling the liquid in the tube until the liquid below the point of injection is frozen and a sufficient amount of liquid above the point of injection is frozen to restrict the rate of flow of the liquid to a predetermined amount; and heating the tube until the frozen liquid adjacent the tube has melted sufficiently to transmit the pressure of the injected liquid to the lower end of the tube to thereby force the frozen liquid out of the tube.

11. The method of claim 10 further characterized by the additional step of increasing the rate of injection of the liquid into the tube while the tube is being heated to thereby increase the speed the frozen liquid is discharged from the tube.

12. The method of freezing liquids comprising:

filling an elongated, inclined tube with the liquid to be frozen;

pumping additional liquid at a constant pressure through an orifice and into the tube at a point adjacent to but spaced above the lower end of the tube to continuously circulate the liquid above the point where the liquid enters the tube;

refrigerating the flow tube to solidify the liquid below the point where additional liquid is being pumped into the tube and to freeze the liquid being circulated along the walls of the tube until the rate of flow of liquid into the tube is reduced to a predetermined value; and heating the walls of the tube to melt the frozen liquid adjacent the walls to produce a thin film of liquid from the point where the liquid is being pumped into the tube to the lower end of the tube below the solid liquid formed therein to thereby force the frozen liquid from the tube.

References Cited in the file of this patent

UNITED STATES PATENTS

| | | |
|---|---|---|
| 2,821,070 | Watts et al. | Jan. 28, 1958 |
| 2,886,954 | Botteiger | May 19, 1959 |
| 2,921,443 | Lee | Jan. 19, 1960 |
| 3,068,660 | Council et al. | Dec. 18, 1962 |